Patented Feb. 9, 1926.

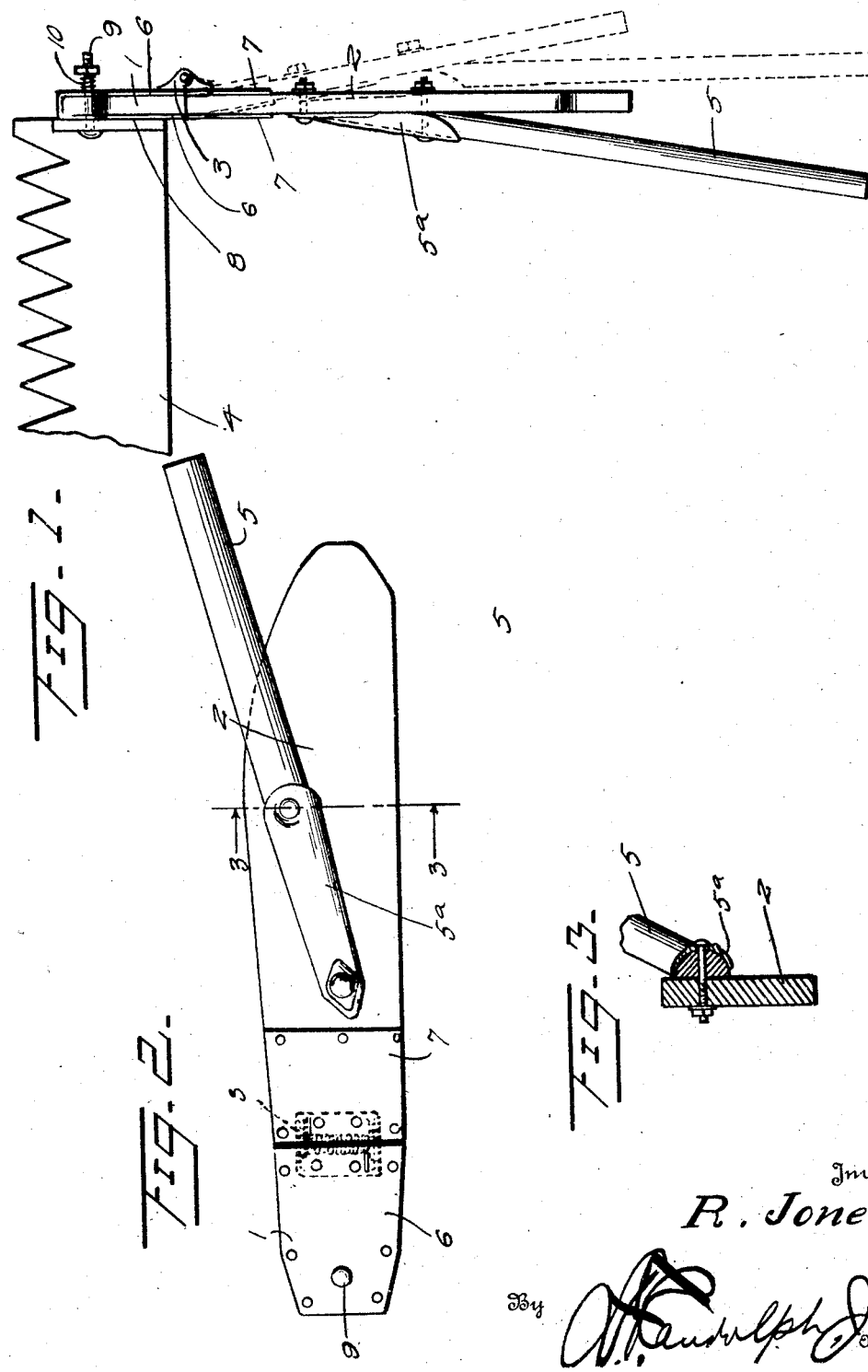

1,572,146

UNITED STATES PATENT OFFICE.

RICHARD JONES, OF PARKVILLE, MISSOURI.

DIVIDER BOARD.

Application filed May 24, 1923. Serial No. 641,213.

*To all whom it may concern:*

Be it known that I, RICHARD JONES, a citizen of the United States, residing at Parkville, in the county of Platte and State of Missouri, have invented certain new and useful Improvements in Divider Boards; and I do hereby declare the following to be a full, clear, and exact description of the invention, such as will enable others skilled in the art to which it appertains to make and use the same.

The invention relates to divider boards for mowing machines and provides a divider having a laterally yieldable connection with the cutter bar and having an outwardly yieldable rear portion whereby to avoid stumps, bowlders and analogous obstructions, thereby preventing injury to the divider and the cutting mechanism.

Other objects and advantages will be apparent and suggest themselves as the nature of the invention is understood.

While the drawings illustrate an embodiment of the invention it will be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of a divider board illustrative of the invention, showing a portion of the cutting mechanism, the dotted lines indicating the yielding portion when moved laterally, as when engaging a stump, bowlder or like obstruction, Figure 2 is a side view of the divider board, and Figure 3 is a sectional detail on the line 3—3 of Figure 2.

Corresponding and like parts are referred to in the following description and designated in the several views of the drawings by like reference characters.

In accordance with the present invention, the divider board for mowing and harvesting machines comprises two parts 1 and 2 which are pivotally or hingedly connectd at 3, the hinge being of any preferred spring type, whereby to normally hold the parts 1 and 2 in line with their contiguous ends abutting in rule joint fashion. The part 1 is relatively short and is carried at the outer end of the bar 4 which is provided with the usual cutting mechanism. The part 2 is relatively long and is adapted to yield outwardly whenever the pressure on its inner side, is great enough to overcome the tension of the spring of the hinge 3, thereby preventing injury to the divider board as a whole and to the cutting mechanism. The usual grain arm 5 is carried by the yieldable part 2 of the divider board and moves therewith and is located upon the inner side thereof and is fitted in a keeper $5^a$.

The parts 1 and 2 are usually of wood and in the present instance the part 1 has metal plates 6 secured to opposite sides thereof and the part 2 has plates 7 upon opposite sides of its forward portion. These plates 6 and 7 reinforce the parts 1 and 2 and have the leaves or members of the hinge 3 attached thereto.

The outer end of the finger bar 4 has an upstanding lug 8, and a bolt 9 passes through openings in the lug 8 and part 1 and receives a spring 10 upon its outer end whereby to establish a laterally yieldable connection between the grain divider and the cutter bar.

What is claimed is:

In combination with a bar forming part of the cutting mechanism of a mower or the like, a support rising from one end of said bar, a divider extending rearwardly from said bar, said divider having sections yieldably connected together, a bolt passing through said support and the divider and constituting the connection of the divider, a spring on said bolt engaging said divider and urging the latter toward and normally maintaining it in contact with the support, said spring and bolt being proportioned to permit movement of the divider on the bolt against the tension of the spring and in a direction away from said support.

In testimony whereof I affix my signature.

RICHARD JONES.